US011436864B2

(12) United States Patent
Burk et al.

(10) Patent No.: US 11,436,864 B2
(45) Date of Patent: Sep. 6, 2022

(54) DRIVER RECOGNITION TO CONTROL VEHICLE SYSTEMS

(71) Applicant: Micron Technology, Inc., Boise, ID (US)

(72) Inventors: Michael Tex Burk, Orangevale, CA (US); Robert Richard Noel Bielby, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/928,788

(22) Filed: Jul. 14, 2020

(65) Prior Publication Data
US 2022/0019767 A1   Jan. 20, 2022

(51) Int. Cl.
*G06V 40/16* (2022.01)
*G06K 9/62* (2022.01)

(52) U.S. Cl.
CPC ......... *G06V 40/172* (2022.01); *G06K 9/6256* (2013.01); *G06K 9/6262* (2013.01); *G06V 40/166* (2022.01); *G06V 40/171* (2022.01)

(58) Field of Classification Search
CPC ........... G06K 9/00288; G06K 9/00255; G06K 9/00281; G06K 9/6262; G06K 9/6256
See application file for complete search history.

(56) References Cited

U.S. PATENT DOCUMENTS

| | | | |
|---|---|---|---|
| 5,005,664 A | 4/1991 | Hoffmann | |
| 5,835,022 A | 11/1998 | Amano | |
| 6,323,761 B1 | 11/2001 | Son | |
| 9,747,795 B1 | 8/2017 | Espinosa | |
| 10,131,323 B1 | 11/2018 | Sterling | |
| 10,155,499 B1 | 12/2018 | Mazaira et al. | |
| 10,665,070 B1 * | 5/2020 | Picardi | G08B 25/008 |
| 10,717,412 B2 | 7/2020 | Abel Rayan et al. | |
| 10,850,709 B1 * | 12/2020 | Nagata | B60R 25/25 |

(Continued)

FOREIGN PATENT DOCUMENTS

| | | |
|---|---|---|
| EP | 2295298 B1 | 4/2015 |
| JP | 2014025223 | 2/2014 |

(Continued)

OTHER PUBLICATIONS

International Search Report and Written Opinion, PCT/US2021/040948, dated Oct. 21, 2021.

(Continued)

*Primary Examiner* — Wesley J Tucker
(74) *Attorney, Agent, or Firm* — Greenberg Traurig (57) ABSTRACT

A driver recognition system of a vehicle identifies a person approaching the vehicle as a driver or other user. In one approach, the driver recognition system collects data using one or more cameras of the vehicle. The collected data corresponds to the person approaching the vehicle. Based on the collected data, a computing device determines (e.g., using a machine-learning model) whether the person is a user (e.g., driver) associated with the vehicle. If the person is a user associated with the vehicle, then the computing device causes one or more actions to be performed for the vehicle (e.g., controller configuration, boot up of a computing device, updating software using over-the-air update, etc.).

19 Claims, 4 Drawing Sheets

(56) References Cited

U.S. PATENT DOCUMENTS

| | | | |
|---|---|---|---|
| 2002/0152010 A1* | 10/2002 | Colmenarez | G06K 9/6293 |
| | | | 701/36 |
| 2003/0222758 A1 | 12/2003 | Willats et al. | |
| 2004/0263323 A1 | 12/2004 | Seike et al. | |
| 2012/0056734 A1 | 3/2012 | Ikeda et al. | |
| 2012/0105196 A1 | 5/2012 | Katou | |
| 2013/0006479 A1 | 1/2013 | Anderson | |
| 2013/0033381 A1 | 2/2013 | Breed | |
| 2013/0116919 A1 | 5/2013 | Furuhata et al. | |
| 2014/0379258 A1 | 12/2014 | Beaurepaire et al. | |
| 2015/0081169 A1 | 3/2015 | Pisz | |
| 2015/0336521 A1 | 11/2015 | Tofilescu et al. | |
| 2016/0300410 A1* | 10/2016 | Jones | G06K 9/00348 |
| 2017/0023377 A1 | 1/2017 | Burtner et al. | |
| 2017/0193807 A1 | 7/2017 | Samara | |
| 2017/0355379 A1 | 12/2017 | Hamaguchi et al. | |
| 2018/0001899 A1 | 1/2018 | Shenoy et al. | |
| 2018/0081048 A1 | 3/2018 | Saitou et al. | |
| 2018/0108369 A1 | 4/2018 | Gross | |
| 2018/0201138 A1 | 7/2018 | Yellambalase et al. | |
| 2018/0201187 A1 | 7/2018 | Yellambalase et al. | |
| 2018/0236972 A1* | 8/2018 | Linden | B60R 25/01 |
| 2018/0286232 A1 | 10/2018 | Shau | |
| 2018/0306609 A1 | 10/2018 | Agarwal et al. | |
| 2018/0322711 A1 | 11/2018 | Weimerskirch | |
| 2019/0044951 A1 | 2/2019 | Zivkovic et al. | |
| 2019/0143936 A1* | 5/2019 | Abel Rayan | B60R 25/2045 |
| | | | 701/2 |
| 2019/0256047 A1 | 8/2019 | Iwashita et al. | |
| 2019/0318159 A1* | 10/2019 | Blanc-Paques | B60W 40/08 |
| 2020/0086881 A1 | 3/2020 | Abendroth et al. | |
| 2020/0090314 A1* | 3/2020 | Mayr | G06N 20/00 |
| 2020/0193005 A1* | 6/2020 | Babala | G07C 9/00309 |
| 2020/0211325 A1* | 7/2020 | Kaizerman | G06Q 30/0185 |
| 2020/0276959 A1* | 9/2020 | Cho | B60R 25/01 |
| 2020/0348406 A1 | 11/2020 | Jain et al. | |
| 2020/0406860 A1 | 12/2020 | Mai et al. | |
| 2021/0192864 A1 | 6/2021 | Mcknew et al. | |

FOREIGN PATENT DOCUMENTS

| | | |
|---|---|---|
| JP | 2017001615 | 1/2017 |
| KR | 20070101963 | 10/2007 |
| KR | 20160112213 | 9/2016 |
| KR | 20200071201 | 6/2020 |

OTHER PUBLICATIONS

International Search Report & Written Opinion, PCT/US2021/040947, dated Nov. 1, 2021.

* cited by examiner

DRIVER RECOGNITION TO CONTROL VEHICLE SYSTEMS

FIELD OF THE TECHNOLOGY

At least some embodiments disclosed herein relate to user identification systems in general, and more particularly, but not limited to a driver recognition system for identifying a driver or other user of a vehicle.

BACKGROUND

Facial recognition is one approach often used for identifying a person. In some cases, facial recognition is used to identify a user of a product (e.g., a consumer device).

In one example, facial recognition is used to identify a user of a mobile device. The mobile device has a facial recognition sensor that projects infrared dots onto the user's face and then reads the pattern. The pattern is evaluated by a processor of the mobile device to confirm a match with the phone owner's face.

In some approaches, facial recognition identifies a person from a digital image. In one example, the digital image is captured by a camera. Facial recognition systems work by comparing selected facial features from a given image with faces within a database.

In some cases, facial recognition is used for access control or in other forms of security systems. Facial recognition has been used on mobile platforms and in robotics.

Some face recognition algorithms identify facial features by extracting features from the image of a person's face. For example, the algorithm may analyze the relative position of the person's eyes, nose, etc. These features are then used to search for other images with matching features.

Three-dimensional face recognition uses sensors to capture information about the shape of a face. An advantage of three-dimensional face recognition is that it is not affected by changes in lighting and can identify face from a range of viewing angles, including a profile view. Also, using three-dimensional data points from a face significantly improves the precision of the recognition.

In one approach, three-dimensional images are captured by using three tracking cameras that point at different angles. A first of the cameras points at the front of the subject, a second camera points to the side, and a third camera points at an angle. All of the cameras work together to track the subject's face in real-time, and to detect and recognize the subject.

In some cases, facial recognition technology learns from changes in a user's appearance. In one example, such technology can identify the user even when the user is wearing hats, scarves, glasses, sunglasses, a beard, or makeup.

BRIEF DESCRIPTION OF THE DRAWINGS

The embodiments are illustrated by way of example and not limitation in the figures of the accompanying drawings in which like references indicate similar elements.

DETAILED DESCRIPTION

The following disclosure describes various embodiments for using a user recognition system to identify a driver or other user of a vehicle. In one example, a person that is approaching a vehicle is identified as being the driver or an authorized user. In one example, the identification of a driver is performed by a computing device of a manually-driven vehicle. In another example, the identification of an authorized user of an autonomous vehicle is performed. In one example, the manually-driven or autonomous vehicle is a car, an aircraft, or a watercraft.

In prior vehicles, persons that approach and enter a vehicle are not adequately identified prior to entering the vehicle, and the vehicle is not sufficiently configured in response to the identification. In many cases, a vehicle is operated by more than one person. The failure of the vehicle to adequately identify a person that is approaching and will operate the vehicle causes a technical problem in which the vehicle is often not in an appropriate configuration for the person that will actually operate the vehicle (e.g., a situation in which the prior driver or user that operated the vehicle is a different person than the current driver/user). In some cases, the vehicle will not be appropriately configured for performing in a manner suitable for the particular driver that is operating the vehicle. Thus, the vehicle may operate inefficiently and/or inaccurately. For example, policies, processes, and/or rules used by the vehicle for the driver may be incorrectly set for a prior driver.

In one example, the driver may be handicapped and require that a seat or other mechanical components of vehicle be positioned in a particular way. In one example, the driver may be a commercial operator of a vehicle and require that vehicle systems (e.g., software applications) be loaded and configured in a manner suitable for the technical applications implemented by the driver and/or the processes used by the driver. Failure of the vehicle to be properly configured causes time-consuming delay while the vehicle is manually configured by the driver. In addition, in some cases the failure of the vehicle to be properly configured can be a safety hazard due to a driver being delayed in operating the vehicle when needing to escape a dangerous environment, and/or being distracted while needing to operate the vehicle.

Various embodiments of the present disclosure provide a technological solution to one or more of the above technical problems. In one embodiment, when a person approaches a vehicle, a camera of the vehicle recognizes the person as a driver/owner or other authorized user associated with the vehicle (e.g., a family member of the driver). In response to recognizing the person, the vehicle is prepared for use by the person. Examples of such preparation include unlocking a door of the vehicle, booting up a computer system of the vehicle, turning on an HVAC system of the vehicle, predicting and launching applications to be used by the person while inside the vehicle, and/or adjusting settings of the vehicle specifically for the person.

In one embodiment, a vehicle includes one or more cameras (e.g., mounted on the exterior of the vehicle, or otherwise mounted to capture images external to the vehicle). A memory device of the vehicle stores a user database of users that are authorized to operate the vehicle. A computing device of the vehicle collects data using the camera(s). The collected data corresponds to a person (e.g., a driver) that has been detected as approaching the vehicle. In one example, a sensor other than one of the cameras is used to detect that the person is approaching. In response to detection by the sensor, one or more of the cameras are activated to start collecting image data that will be analyzed by the computer device.

The computing device determines, based on the collected data, that the person is an authorized user in the user database. In response to determining that the person is an authorized user, one or more actions are performed for the vehicle (e.g., the preparation of the vehicle discussed above).

In one embodiment, a driver-friendly recognition technique does not require that the driver look directly into a camera in order to be identified (e.g., a profile is sufficient). In some embodiments, a camera is not required to identify a person.

In one example, an artificial neural network (ANN)-based recognizer analyzes the way that the person approaches the vehicle in connection with other inputs (e.g., time, location, routing) to make a determination regarding an identity of the person. In one embodiment, the ANN is trained using data obtained from a period of usage of the vehicle. In one example, a new car does not have to recognize the owner immediately, or even in a day or two, but then recognizes the owner after a predetermined period (e.g., 5 days) of usage, or after a number of uses of the vehicle (e.g., as measured by engine or motor start-up or activation). In some cases, the ANN may be configured to "forget" some out-of-date patterns/habits (e.g., delete certain data or training parameters) of a driver or user.

In general, an ANN may be trained using a supervised method where the parameters in the ANN are adjusted to minimize or reduce the error between known outputs resulted from respective inputs and computed outputs generated from applying the inputs to the ANN. Examples of supervised learning/training methods include reinforcement learning, and learning with error correction.

Alternatively, or in combination, an ANN may be trained using an unsupervised method where the exact outputs resulted from a given set of inputs are not known before the completion of training. The ANN can be trained to classify an item into a plurality of categories, or data points into clusters. Multiple training algorithms can be employed for a sophisticated machine-learning/training paradigm.

In one example, an artificial neural network may be configured as an ANN or as a convolutional neural network (CNN) that is trained using reinforcement learning. For example, the ANN may collect images, voice recordings, and other sensor data for persons approaching the vehicle and store the data in a database during a training period. When a person enters the driver's seat during the training period, the person is identified in the database as an authorized user and the data for that person is reinforced in the ANN. During the training period the machine-learning model will collect new sensor data for authorized users (e.g., changes in appearance (clothing, glasses, facial hair, etc.), different lighting conditions, different angles, etc.) and will learn and reinforce recognition of authorized users.

In one embodiment, more than one person may approach a vehicle simultaneously. In one example, the vehicle is configured for the person that is determined by a controller of the vehicle to be nearest to the driver's door of the vehicle. In another example, the vehicle is configured for a person determined to have a highest priority, as based on priority data in a user database.

In one embodiment, data collected by one or more cameras is used to determine a location of the user relative to the vehicle, and to open one or more selected doors based on the location of the user. In one embodiment, the data includes collection of weather data at the time the person is approaching the vehicle. The vehicle is configured at least in part based on the determined weather.

In one embodiment, a first camera faces towards one side (e.g., a left side) of the vehicle, and a second camera faces towards an opposite side (e.g., a right side) of the vehicle. Image data collected by the cameras is provided as an input into facial recognition software. The facial recognition software is trained for each of several users. A database of user data is accessed by a computing device that is running the facial recognition software.

After positive detection of a user is made, user preferences are accessed in the user database. These user preferences may include an actual manner of operation as determined for the user after a predetermined number of approaches and entries to the vehicle have been made, and the user has configured the vehicle (e.g., made settings to knobs, switches, etc.) following the approach and entry.

The vehicle is configured for the identified, approaching user based on the user preferences. In one example, these user preferences include performing actions related to unlocking a door, adjusting a seat, adjusting mirrors, setting a temperature, selecting a radio station, setting a vehicle mode of operation, etc. In one example, the vehicle mode of operation is fuel-efficient versus high-performance.

In one embodiment, the image data collected by one or more cameras is transmitted to a central server (e.g., that serves multiple vehicles) using wireless communication. The central server performs an identification process and transmits an identification of a person back to the vehicle. The identification of the person can be based on a machine-learning model executing on the server. In one embodiment, the machine-learning model is trained using data from other vehicles that are used by the person. In one example, the other vehicles communicate with the server.

Figure 1:
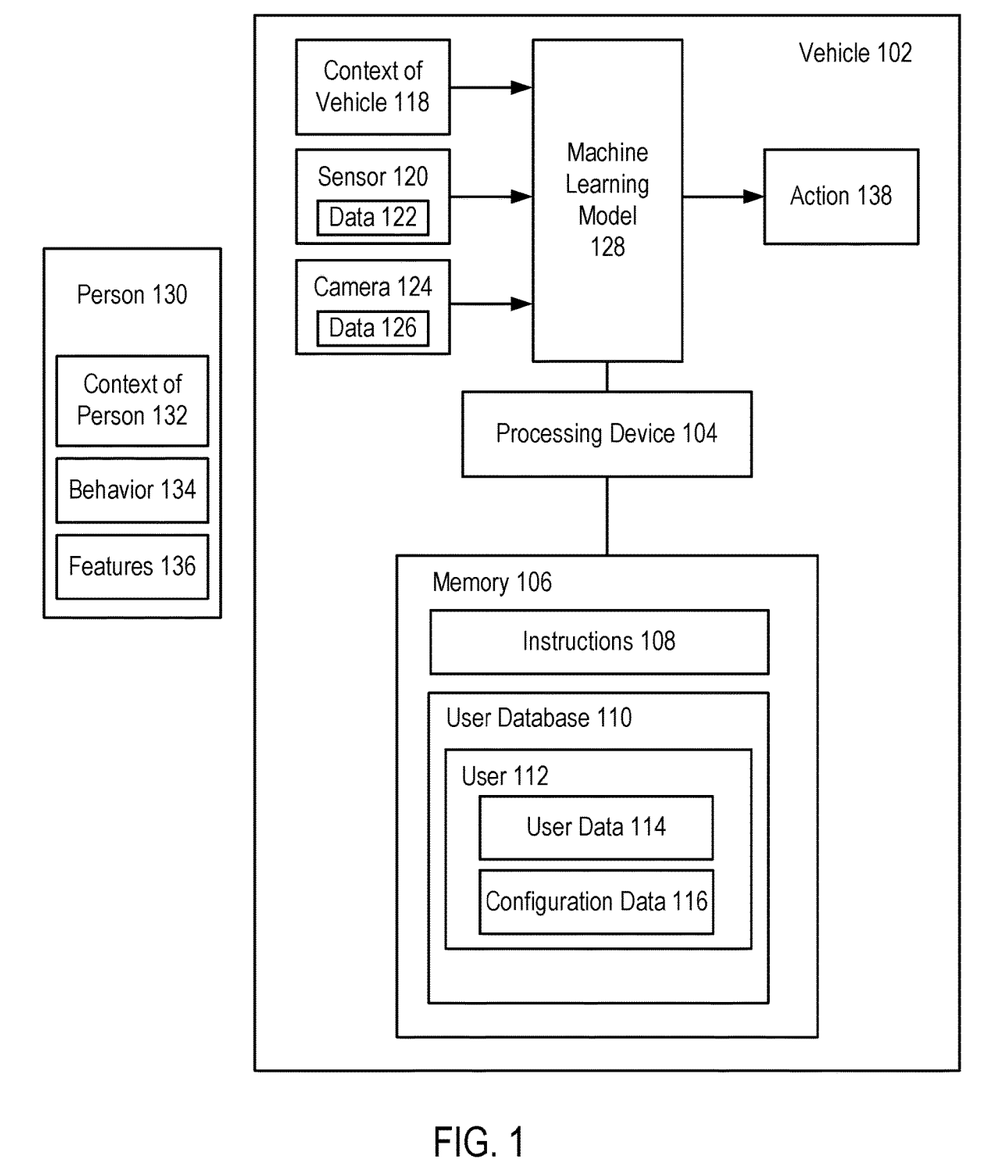
FIG. 1 shows a vehicle that uses a machine-learning model to identify a person that is approaching the vehicle, in accordance with some embodiments.

FIG. 1 shows a vehicle 102 that uses a machine-learning model 128 to identify a person 130 that is approaching, or otherwise outside around the vehicle, in accordance with some embodiments. Vehicle 102 includes a processing device 104. In one embodiment, the processing device 104 uses a machine-learning model 128 and a user database 110, along with input from camera(s) 124, and/or sensor(s) 120, and/or information about the context of the vehicle 118, and/or information about the context of a person 132 approaching the vehicle 102, to implement a driver recognition system. In other embodiments, machine-learning is not required and other computer models and/or data processing can be used. The processing device 104 may be, for example, a microprocessor, graphics processor, embedded processor, embedded computer, system on a chip, ASIC, FPGA, or other processing device.

Vehicle 102 contains memory 106 connected to the processing device 104. Memory 106 may be non-volatile memory or a combination of non-volatile and volatile memories. For example, memory 106 may contain flash memory (e.g., SLC, MLC, TLC, QLC, etc.), 3D XPoint memory, DRAM, SRAM, other memory technologies, or any combination of memory technologies. Memory 106 may be in any form including, for example, solid-state disk, compact flash module, PCIe card, NVMe module, DIMM, SIMM, soldered to a motherboard, or other formfactor.

Memory 106 contains instructions 108 used by the processing device 104 to implement the driver recognition system. Instructions 108 may include, for example, instructions that the processing device 104 uses in collecting data (e.g., camera data 126, or sensor data 122), determining the context of the vehicle 118 or the context of a person 132 approaching the vehicle 102 (e.g., geographic location, time of day, etc.), or processing the data (e.g., using the machine-learning model 128), and/or performing one or more actions 138 when a driver is recognized.

In various embodiments, numerous types of sensors can be used for recognizing an approaching driver. In addition to cameras, various sensors can be used including LiDAR, radar, and/or infrared sensors. One or more microphones can also be used. These sensors can collect sensor data while the person is approaching the vehicle.

The memory 106 also contains user database 110. User database 110 contains information about each user 112 that is associated with the vehicle 102 (e.g., user 112 may be a driver, a family member of the driver, and/or a friend of the driver as determined from a social network server by processing device 104). The user database 110 may be one of many types of databases. For example, user database 110 may be a relational database or non-relational database, and may use any structure and access method (e.g., SQL, NoSQL, XML, etc.). In one embodiment, the user database 110 is stored in the same memory 106 as the instructions 108. In one embodiment, the user database 110 and instructions 108 are stored in separate memory devices. In one embodiment, the user database 110 is spread across multiple memory devices. In one embodiment, the user database 110 is implemented so that data is provided from a user database as a cloud-connected service (e.g., a service that communicates over a wireless network with vehicle 102).

The user database 110 contains information about each user 112 associated with the vehicle 102, including, for example, user data 114 and configuration data 116. User data 114 may include, for example, data used to identify a user 112 and data about a user 112. For example, data used to identify a user 112 may include biometric data, such as facial features, height, body build, hair color, etc., and/or behavioral data, such as posture, gait, voiceprint, etc. Data about a user 112 may also include, for example, name, address, contact information, etc., associated with the user 112.

Configuration data 116 stored in the user database 110 may be used, for example, to store preferences associated with user 112. For example, configuration data 116 may include preferred settings for user 112 associated with the vehicle 102 (e.g., seat, mirror and pedal positions, temperature and ventilation, dashboard illumination level, radio station preferences, etc.). Configuration data 116 may also include software applications preferred by user 112 (e.g., software used to operate functions of vehicle 102).

In one embodiment, configuration data 116 may include other preferences for user 112 that are not directly associated with the components of vehicle 102 itself. For example, preferred gas stations, dining and entertainment venues, routes, etc. may be associated with user 112.

Input to the driver recognition system may come from many sources including, for example, data 126 from one or more camera(s) 124, data 122 from one or more sensor(s) 120, the context of the vehicle 118, and the context of a person 132 approaching the vehicle 102. Data 126 from camera 124 may include, for example, still pictures or video data of person(s) 130 approaching the vehicle 102. Data 122 from sensor 120 may include, for example, the location of a person 130 relative to the vehicle 102, or voiceprint data or commands from a person 130 speaking near the vehicle 102. The context of the vehicle 118 may include, for example, data regarding the location of the vehicle 102, time of day, route travelled by the vehicle 102, etc.

The camera(s) 124 and sensor(s) 120 may gather information about one or more person(s) 130 approaching or near the vehicle 102. For example, this may include features 136 of the person 130 (e.g., facial features, height, body build, hair color, etc.), behavior 134 of the person 130 (e.g., posture, gait, voiceprint, etc.), or context of the person 132 (e.g., is the person 130 in a location, and at a time of day, that is usual for a user 112 of the vehicle 102, has vehicle 102 travelled a route that is usual for a user 112 of vehicle 102, etc.).

Processing device 104 may use machine-learning model 128 as part of the driver recognition system. The machine-learning model 128 may learn features 136 (e.g., facial features, height, body build, hair color, etc.), behavior 134 (e.g., posture, gait, voiceprint, etc.), or context of user(s) 112 associated with the vehicle 102 and may store such data in the user database 110. The machine-learning model 128 may take data, such as, for example, camera data 126, sensor data 122, context of the vehicle 118, and/or context of the person 132 as inputs, and run algorithms (e.g., facial recognition, behavior recognition, and/or voice recognition, etc.) in determining whether person 130 is a user 112 associated with the vehicle 102. The machine-learning model 128 may be trained to recognize user(s) 112 associated with vehicle 102 for a predetermined time period before the driver recognition system is activated.

Data may be removed from the user database 110 for user(s) 112 who are no longer using vehicle 102 (e.g., users who are no longer authorized to use vehicle 102). For example, if a user 112 has not used vehicle 102 for a predetermined time, user data 114 and configuration data 116 associated with user 112 may be removed from the user database 110. The driver recognition system may use the updated user database 110 to re-train the machine-learning model 128.

Vehicle 102 may perform one or more action(s) 138 when a person 130 is determined to be a user 112 associated with the vehicle 102. For example, vehicle 102 may unlock a door near user 112, or may unlock multiple doors. Vehicle 102 may access user 112 configuration data 116 to configure the vehicle 102 with settings preferred by user 112 (e.g., climate control, seat, mirror, and pedal positions, radio stations, phone contacts, navigation points of interest, etc.). Vehicle 102 may also perform one or more over-the-air software updates to configure the vehicle 102 for user 112, or may execute software associated with user 112.

Figure 2:
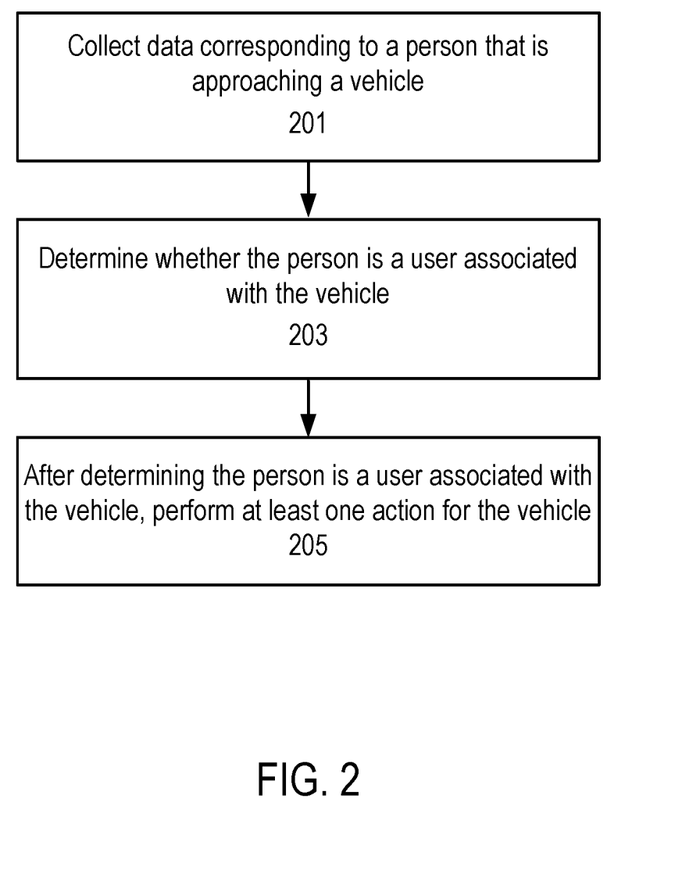
FIG. 2 shows a method for performing one or more actions for a vehicle after determining that a person is a user associated with the vehicle, in accordance with some embodiments.

FIG. 2 shows a method for performing one or more actions (e.g., configuration of a computing system) for a vehicle after determining that a person is a user associated with the vehicle, in accordance with some embodiments. For example, the method of FIG. 2 can be implemented in the system of FIG. 1. In one example, the vehicle is vehicle 102 and the person is person 130.

The method of FIG. 2 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 2 is performed at least in part by one or more processing devices (e.g., processing device 104, such as a controller, of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 201, data is collected corresponding to a person that is approaching a vehicle. In one example, the data is collected while the person is moving. In one example, the data is collected after the person has approached within a distance (e.g., less than 5-100 meters) of the vehicle, but has stopped moving. In one example, the data is collected by camera 124 and/or sensor 120 of vehicle 102.

At block 203, it is determined whether the person is a user associated with the vehicle. In one example, machine-learning model 128 is used by processing device 104 to determine whether person 130 is a driver of vehicle 102.

At block 205, after determining that the person is a user associated with the vehicle, one or more actions for the vehicle are performed. In one example, processing device 104 causes one or more actions 138 to be performed on vehicle 102.

Figure 3:
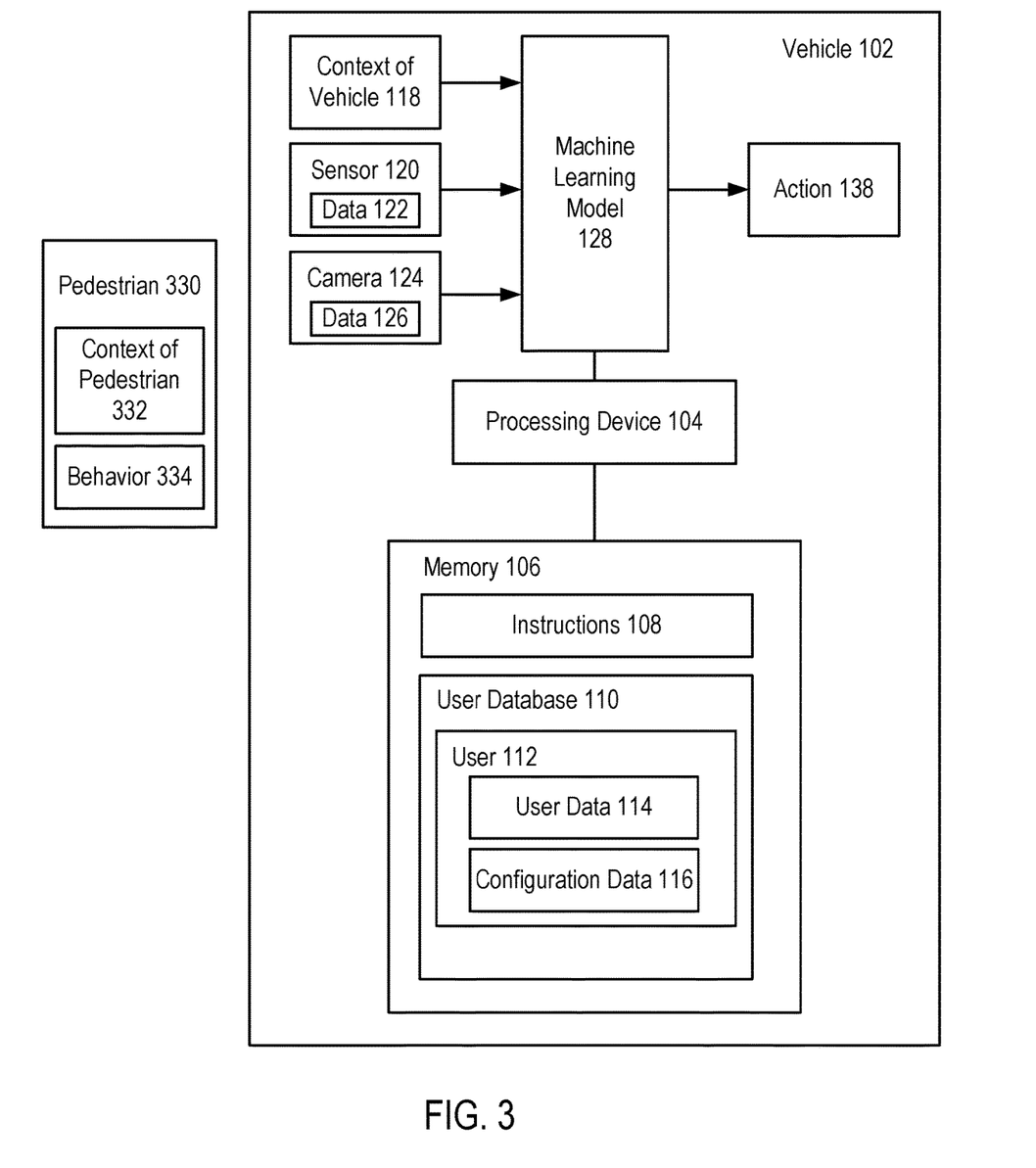
FIG. 3 shows a vehicle that uses a machine-learning model to identify a pedestrian that may intersect the path of the vehicle, in accordance with some embodiments.

FIG. 3 shows a vehicle that uses a machine-learning model to identify a pedestrian that may intersect the path of the vehicle, in accordance with some embodiments. In one example, the pedestrian (e.g., pedestrian 330) may be difficult for a driver to see. In one embodiment, machine-learning model 128 may receive data (e.g., data 124, 126, etc.) from sensors (e.g., camera 124, sensor 120, etc.) and determine that pedestrian 330 may intersect the path of vehicle 102 (e.g., a person is walking in a direction and/or otherwise in a way that will result in the person being struck by the vehicle). After determining that pedestrian 330 may intersect the path of vehicle 102, processing device 104 causes an action (e.g., action 138) for vehicle 102. In other embodiments, machine-learning is not required and other computer models and/or data processing can be used. In one embodiment, vehicle 102 of FIG. 3 is similar to vehicle 102 as described for FIG. 1.

In one example, pedestrian 330 is near (e.g., within 1-5 meters) of vehicle 102. Pedestrian 330 may be difficult for the driver of vehicle 102 to see (e.g., the pedestrian is located between parked vehicles, in a crosswalk with the driver's view obstructed by other vehicles, etc.) In one embodiment, camera 124 and/or sensor 120 send data 124, 126 related to pedestrian 330 to machine-learning model 128. Data 124, 126 may include, for example, still images, video images, LiDAR images, radar images, or other type of data.

In one embodiment, machine-learning model 128 receives and processes data 124, 126 related to pedestrian 330. Machine-learning model 128 identifies the context (e.g., context of pedestrian 332) and behavior (e.g., behavior 334) of pedestrian 330. The context of pedestrian 332 may include, for example, location of pedestrian 330 (e.g., how close is pedestrian 330 to vehicle 102), visibility of pedestrian 330 (e.g., partially hidden between parked vehicles), orientation of pedestrian 330 (e.g., facing toward the path of vehicle 102), age of pedestrian 330 (e.g., adult or child), etc. Behavior 334 of pedestrian 330 may include, for example, running or walking toward the path of vehicle 102, staggering near or in the path of vehicle 102, standing in or near the path of vehicle 102, etc. Machine-learning model 128 may determine that pedestrian 330 may intersect the path of vehicle 102.

In one embodiment, after machine-learning model 128 determines that pedestrian 330 may intersect the path of vehicle 102, processing device 104 causes an action 138 for vehicle 102. In one example, action 138 is an alert to the driver of vehicle 102 (e.g., an audible or visible alarm). In one example, action 138 controls a function of vehicle 102 (e.g., braking, steering, etc.)

Figure 4:
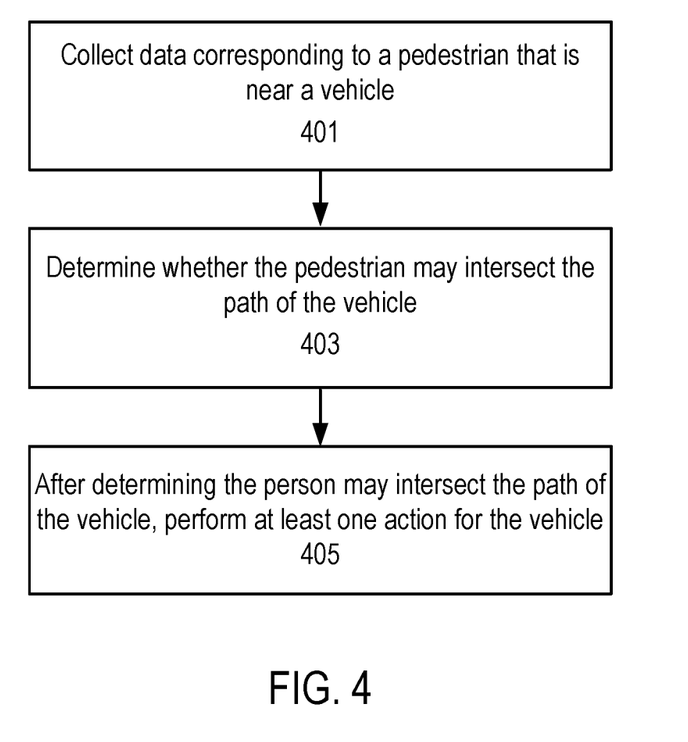
FIG. 4 shows a method for performing one or more actions for a vehicle after determining that a pedestrian may intersect the path of the vehicle, in accordance with some embodiments.

FIG. 4 shows a method for performing one or more actions for a vehicle after determining that a pedestrian may intersect the path of the vehicle, in accordance with some embodiments. For example, the method of FIG. 4 can be implemented in the system of FIG. 3. In one example, the vehicle is vehicle 102 and the pedestrian is pedestrian 330.

The method of FIG. 4 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 4 is performed at least in part by one or more processing devices (e.g., processing device 104 of FIG. 3).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 401, data is collected corresponding to a pedestrian that is near a vehicle. In one example, the data is collected while the person is moving. In one example, the data is collected after the person has approached within a distance (e.g., less than 1-5 meters) of the vehicle, but has stopped moving. In one example, the data is collected by camera 124 and/or sensor 120 of vehicle 102.

At block 403, it is determined whether the person may intersect the path of the vehicle. In one example, machine-learning model 128 is used by processing device 104 to determine whether pedestrian 330 may intersect the path of vehicle 102.

At block 405, after determining that the pedestrian may intersect the path of the vehicle, one or more actions for the vehicle are performed. In one example, processing device 104 causes one or more actions 138 to be performed on vehicle 102. In one example, vehicle 102 alerts the driver of vehicle 102. In one example, vehicle 102 takes evasive action (e.g., applying the brakes).

In one embodiment, a method comprises: collecting data (e.g., data 122, 126) using at least one camera (e.g., camera 124) of a vehicle, wherein the collected data corresponds to a person (e.g., person 130) that is approaching the vehicle; determining, based on the collected data, whether the person is a user associated with the vehicle; and in response to determining that the person is a user associated with the vehicle, performing at least one action (e.g., action 138) for the vehicle.

In one embodiment, determining whether the person is a user associated with the vehicle comprises evaluating the collected data using a machine-learning model (e.g., machine-learning model 128).

In one embodiment, the method further comprises prior to determining whether the person is a user associated with the vehicle, training the machine-learning model using training data collected by the at least one camera over a predetermined time period.

In one embodiment, the method further comprises: determining older data of the training data that has an age over a predetermined limit; removing the older data from the training data to provide updated training data; and training the machine-learning model using the updated training data.

In one embodiment, determining whether the person is a user associated with the vehicle comprises performing facial recognition by processing the collected data to identify a first user stored in a user database (e.g., user database 110).

In one embodiment, the user database stores configuration data for users of vehicles, including first configuration data for the first user.

In one embodiment, performing the at least one action comprises configuring the vehicle using the first configuration data.

In one embodiment, configuring the vehicle comprises performing an over-the-air update of software used by a controller (e.g., processing device 104 when implemented as a controller) of the vehicle.

In one embodiment, determining whether the person is a user associated with the vehicle comprises performing feature recognition by processing the collected data to identify features (e.g., non-facial features 136), other than facial features, of the person that correspond to a first user of the vehicle.

In one embodiment, determining whether the person is a user associated with the vehicle comprises comparing a behavior (e.g., behavior 134) of the person to user data stored in a user database for users of vehicles.

In one embodiment, the method further comprises determining a context associated with the person (e.g., context of person 132) that is approaching the vehicle. Determining whether the person is a user associated with the vehicle further comprises using a machine-learning model for which the behavior of the person and the context are inputs. An output of the model is used to identify a first user in the user database.

In one embodiment, the context comprises at least one of a time of day, a geographic location of the vehicle, a routing of the vehicle, or sensor data collected by one or more sensors of the vehicle while the person is approaching the vehicle.

In one embodiment, determining whether the person is a user associated with the vehicle comprises identifying a first user authorized to drive the vehicle, and performing the at least one action comprises executing software associated with the first user. In one example, the software is stored in memory 106 and executed by processing device 104.

In one embodiment, the method further comprises determining a location of the person exterior to the vehicle. Performing the at least one action comprises selecting a door of the vehicle corresponding to the determined location, and unlocking the door.

In one embodiment, a system comprises: at least one camera; memory configured to store a user database of users authorized to operate a vehicle; at least one processing device; and memory containing instructions configured to instruct the at least one processing device to: collect data using the at least one camera, wherein the collected data corresponds to a person that is approaching the vehicle; determine, based on the collected data, that the person is a first user in the user database; and in response to determining that the person is the first user, perform at least one action for the vehicle.

In one embodiment, the at least one action comprises at least one of unlocking a door, starting a heating or air conditioning system, predicting and launching software for use by the first user, or adjusting at least one setting of a component or system of the vehicle.

In one embodiment, the instructions are further configured to instruct the at least one processing device to: determine a behavior of the person, wherein the behavior comprises a pattern of movement by the person; and determine a context of the vehicle (e.g., context of vehicle 118); wherein determining that the person is the first user comprises providing an output from a machine-learning model that uses the behavior of the person and the context of the vehicle as inputs.

In one embodiment, the instructions are further configured to instruct the at least one processing device to: determine a context of the person or the vehicle; wherein the at least one action comprises selecting software based on the context, and launching the selected software.

In one embodiment, a non-transitory computer-readable medium stores instructions which, when executed on a computing device, cause the computing device to at least: collect data using at least one camera, wherein the collected data corresponds to a person that is approaching a vehicle; determine, based on the collected data, whether the person is a user associated with the vehicle; and in response to determining that the person is a user associated with the vehicle, perform at least one action for the vehicle.

In one embodiment, determining whether the person is a user associated with the vehicle comprises performing facial recognition by processing the collected data to identify a first user stored in a user database of the vehicle.

In one embodiment, a method includes: collecting data using at least one camera of a vehicle, wherein the collected data corresponds to a person that is approaching the vehicle; signaling, by the camera based on the collected data, a processing device (e.g., processing device 104) of the vehicle; in response to the signaling, determining, by the processing device, a context associated with the person; determining, by the processing device based on the collected data, whether the person is a user associated with the vehicle, wherein the determining comprises comparing a behavior of the person to user data stored in a user database for users of vehicles, and wherein the determining further comprises using a machine-learning model for which the behavior of the person and the context are inputs, and wherein an output of the model is used to identify a first user in the user database; and in response to determining that the person is a user associated with the vehicle, performing at least one action for the vehicle.

In one embodiment, the camera communicates with the processing device over a communications bus of the vehicle.

In one embodiment, the method further includes: communicating, by the processing device over a wireless interface (e.g., a wireless communications interface of vehicle 102), with a server, the server configured to train the machine-learning model, and send an update to the processing device for updating the machine-learning model based on the training, wherein data used for training the machine-learning model is obtained by the server from sensors of other vehicles.

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and operations may be described as being performed by or caused by software code to simplify description. However, those skilled in the art will recognize what is meant by such expressions is that the functions result from execution of the code by one or more processors, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media can include, but are not limited to, non-volatile embedded devices using NOR, managed NAND devices including eMMC, UFS, SSD, and un-managed NAND devices.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
   collecting data using at least one camera of a vehicle, wherein the collected data corresponds to a first and a second person that are approaching the vehicle;
   signaling, by the camera based on the collected data, a processing device of the vehicle;
   in response to the signaling, determining, by the processing device, a context associated with the first and the second person;
   determining, by the processing device based on the collected data, whether the first person is a user associated with the vehicle, wherein the determining comprises:
   determining that the first person is closer to a driver's door of the vehicle than the second person, and then comparing a behavior of the first person to user data stored in a user database for users of vehicles;
   using a machine-learning model for which the behavior of the first person and the context are inputs, wherein an output of the model is used to identify a first user in the user database; and
   communicating, by the processing device over a wireless interface, with a server, the server configured to perform an identification process using the machine-learning model trained using data from at least one other vehicle than the vehicle from which the data has been collected, and transmit an identification of the first person back to the vehicle; and
   in response to determining that the first person is a user associated with the vehicle, performing at least one action for the vehicle.

2. The method of claim 1, wherein determining the context further comprises signaling, by the processing device, a sensor other than the camera, the signaling to initiate data collection by the sensor.

3. The method of claim 1, further comprising:
   prior to determining whether the first person is a user associated with the vehicle, training the machine-learning model using training data collected by the at least one camera over a predetermined time period.

4. The method of claim 3, further comprising:
   determining older data of the training data that has an age over a predetermined limit;
   removing the older data from the training data to provide updated training data; and
   training the machine-learning model using the updated training data.

5. The method of claim 1, wherein determining whether the first person is a user associated with the vehicle further comprises performing facial recognition by processing the collected data to identify a first user stored in a user database.

6. The method of claim 5, wherein the user database stores configuration data for users of vehicles, including first configuration data for the first user.

7. The method of claim 6, wherein performing the at least one action comprises configuring the vehicle using the first configuration data.

8. The method of claim 7, wherein configuring the vehicle comprises performing an over-the-air update of software used by a controller of the vehicle.

9. The method of claim 1, wherein determining whether the first person is a user associated with the vehicle further comprises performing feature recognition by processing the collected data to identify features, other than facial features, of the first person that correspond to a first user of the vehicle.

10. The method of claim 1, wherein the camera communicates with the processing device over a communications bus of the vehicle.

11. The method of claim 1, wherein the context comprises at least one of a time of day, a geographic location of the vehicle, a routing of the vehicle, or sensor data collected by one or more sensors of the vehicle while the first person is approaching the vehicle.

12. The method of claim 1, wherein determining whether the first person is a user associated with the vehicle further comprises identifying a first user authorized to drive the vehicle, and wherein performing the at least one action comprises executing software associated with the first user.

13. The method of claim 1, further comprising:
   determining a location of the first person exterior to the vehicle;
   wherein performing the at least one action comprises selecting a door of the vehicle corresponding to the determined location, and unlocking the door.

14. A system comprising:
   at least one camera;
   memory configured to store a user database of users authorized to operate a vehicle;
   at least one processing device; and
   memory containing instructions configured to instruct the at least one processing device to:

collect data using the at least one camera, wherein the collected data corresponds to a first and a second person that are approaching the vehicle;

determine, based on the collected data, that the first person is closer to a driver's door of the vehicle than the second person, and that the first person is a first user in the user database, wherein the first user is stored in the user database based on other data collected from at least one other vehicle than the vehicle from which the data is collected, and wherein the at least one other vehicle was used by the first user; and in response to determining that the first person is the first user, perform at least one action for the vehicle.

15. The system of claim 14, wherein the at least one action comprises at least one of unlocking a door, starting a heating or air conditioning system, predicting and launching software for use by the first user, or adjusting at least one setting of a component or system of the vehicle.

16. The system of claim 14, wherein the instructions are further configured to instruct the at least one processing device to:

determine a behavior of the first person, wherein the behavior comprises a pattern of movement by the first person; and determine a context of the vehicle;

wherein determining that the first person is the first user comprises providing an output from a machine-learning model that uses the behavior of the first person and the context of the vehicle as inputs.

17. The system of claim 14, wherein the instructions are further configured to instruct the at least one processing device to:

determine a context of the first person or the vehicle;

wherein the at least one action comprises selecting software based on the context, and launching the selected software.

18. A non-transitory computer-readable medium storing instructions which, when executed on a computing device, cause the computing device to at least:

collect data using at least one camera, wherein the collected data corresponds to a first and a second person that are approaching a vehicle;

determine, based on the collected data, whether the first person is closer to a driver's door of the vehicle than the second person, and whether the first person is a user associated with the vehicle, wherein the user is stored in a user database based on other data collected from at least one other vehicle than the vehicle from which the data is collected; and in response to determining that the first person is a user associated with the vehicle, perform at least one action for the vehicle.

19. The non-transitory computer-readable medium of claim 18, wherein determining whether the first person is a user associated with the vehicle comprises performing facial recognition by processing the collected data to identify the user stored in the user database.

* * * * *